Sept. 11, 1923.
M. A. PEARSON
TIRE PRESS
Original Filed Oct. 6, 1921
1,467,948
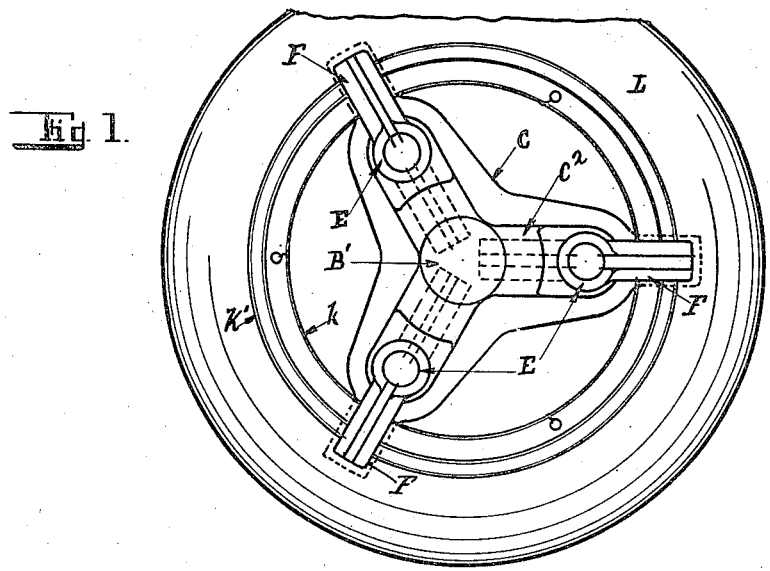
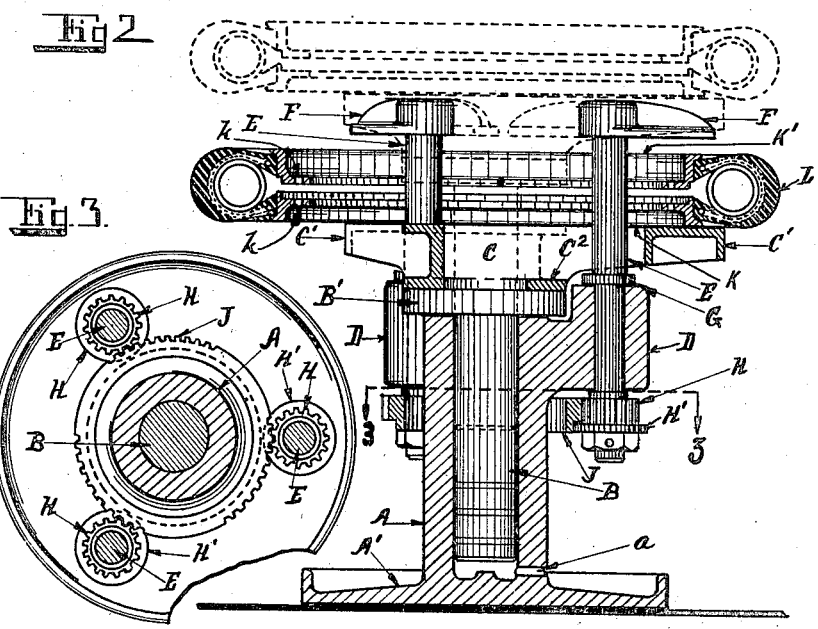
Inventor.
Morris A. Pearson
By J. H. M. Stingon
atty Patented Sept. 11, 1923.

1,467,948

UNITED STATES PATENT OFFICE.

MORRIS A. PEARSON, OF ERIE, PENNSYLVANIA, ASSIGNOR TO ALLEN MACHINE COMPANY, OF ERIE, PENNSYLVANIA, A CORPORATION OF PENNSYLVANIA.

TIRE PRESS.

Application filed October 6, 1921, Serial No. 505,831. Renewed May 31, 1923.

*To all whom it may concern:*

Be it known that I, MORRIS A. PEARSON, a citizen of the United States, residing at Erie, in the county of Erie and State of Pennsylvania, have invented certain new and useful Improvements in Tire Presses; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to machines for use in the manufacture of pneumatic tires.

In the manufacture of tires the casing is first built up and then an annular air bag similar to an inner air tube is inserted into the casing, and then inflated, which causes the beads to spring apart, and then circumferentially split metallic rims are put in place on the casing and are drawn together by means of clamps, and secured together by bolts, and then the casing and rims are placed in a mold and vulcanized therein.

The object of my invention is to provide a suitable press mechanism upon which the casing, air tube, and rims may be assembled, and then the rims pressed together and held in position while the rims are secured together.

In carrying out the object of my invention I provide a hydraulic cylinder and ram upon which I secure a table upon which to assemble the tire and rims, and provide means to engage the upper surface of the upper rim, which is adapted to hold the upper rim down while the ram forces the table and tire upward.

These and other features of my invention are hereinafter fully set forth and described, and are illustrated in the accompanying drawings in which:—

Figure 1, is a plan view of mechanism embodying my invention.

Figure 2, is a vertical central section of the same.

Figure 3, is a transverse section of the same on the line 3—3 in Fig. 2, looking downward.

In these drawings A indicates a hydraulic cylinder which is provided with a suitable base A', said cylinder being provided with an opening $a$ whereby water or other fluid may enter or escape from said cylinder in the usual manner. B indicates a ram in the cylinder A, and B' indicates a head on the upper end of the ram.

Upon the head B' of the ram I place a table C having radial arms C' C' C' adapted to receive and support a tire. This table consists of a ring $C^2$ which rests upon the ram head B', from which ring the arms C' radiate as shown in Fig. 1. These arms have considerable thickness and are slotted out so that between the ring $C^2$ and the upper plane of the arms there is a chamber to receive the holding-down members as hereinafter described.

On the sides of the cylinder A, I provide bracket bearings, preferably three in number, equally spaced there-around, in which are journalled shafts E which support clamp arms F which are preferably non-rotatably secured thereon. It is evident, however, that said clamp arms can be rotatably secured on the shafts E and the shafts non-rotatably secured in the brackets D, if desired.

In the construction shown, the shafts E are provided with collars G to prevent their downward movement in the bearings D.

On the lower ends of the shafts E I secure gear pinions H and flanges H', said pinions H intermeshing with a gear ring J, which encircles the cylinder A, and is supported upon the flanges H', so that when one of the arms F is rotated, all of the shafts E and gear ring J are rotated in unison.

In operation, the arms F are swung inward as shown by broken lines in Fig. 1, and fluid is admitted to the cylinder A which forces the ram B upward, said ram raising the table C and radial arms C' to the position thereof shown by broken lines in Figure 2, so that the arms F being swung inward will be in the chamber in the arms of the table and below the plane of the upper surface thereof.

The lower tire rim K is then placed on the arms C' of the tube; the tire casing L with the inner tube therein is placed on the rim K and the upper rim K' is placed upon the tire casing. The fluid is then allowed to escape from the cylinder A which permits the ram, table and assembled tire to drop down to the position thereof shown by full lines in Fig. 2. The clamp arms are then swung outward to the position thereof shown by full lines in Fig. 1, and fluid is again forced into the cylinder A which causes the ram and table to raise the tire upward against the clamp arms F until the flanges $k$ on the ring are pressed together; said ram holding the pressure on the rims until they are secured together in the usual manner. The fluid is then allowed to escape from the cylinder A, the arms F are swung inward and fluid again admitted to the cylinder, which causes the table C to raise again to the position shown by broken lines in Fig. 2, when the tire can be removed therefrom.

Having thus fully shown and described my invention so that others can utilize the same, I do not desire to have the same limited to the exact construction shown and described, as many modifications can be made therein without departing from the scope of my invention. Therefore, what I claim as new and desire to secure by Letters Patent is:—

1. In an apparatus of the class described, a vertically moveable table having slotted chambers therein, a fluid actuated ram to support said table, vertically stationary shafts passing through said slotted chambers in said table, and swinging clamp arms on said shafts adapted to be enclosed in said chambers when said table is raised to its uppermost position.

2. In an apparatus of the class described, a cylinder, radial bracket bearings on said cylinder, a ram in said cylinder, a table supported on said ram, shafts rotatably mounted in said bracket bearings and extending upwardly through said table, clamp arms non-rotatably secured on said shafts above said table, and gear mechanism adapted to cause said shafts to rotate in unison.

3. In an apparatus of the class described, a hydraulic cylinder, a ram in said cylinder, a skeleton table supported on said ram, bracket bearings on said cylinder, shafts mounted in said bearings, clamp arms secured on said shafts adapted to be swung inward and pass below the upper plane of said table when said ram raises said table to its uppermost position, and gear mechanism adapted to cause said shafts and clamp arms to rotate in unison.

In testimony whereof I affix my signature.

MORRIS A. PEARSON.